United States Patent
Hu

(10) Patent No.: US 10,234,319 B2
(45) Date of Patent: Mar. 19, 2019

(54) SOUND WAVE DETECTION-BASED MEASUREMENT METHOD AND DEVICE FOR LIQUID VOLUME INSIDE CONTAINER

(71) Applicant: SHENZHEN MOIKIT NETWORK TECHNOLOGY CO., LTD, Shenzhen, Guangdong (CN)

(72) Inventor: Jianwei Hu, Guangdong (CN)

(73) Assignee: SHENZHEN MOIKIT NETWORK TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/908,669

(22) Filed: Feb. 28, 2018

(65) Prior Publication Data

US 2018/0188095 A1    Jul. 5, 2018

Related U.S. Application Data

(63) Continuation of application No. PCT/CN2015/089364, filed on Sep. 10, 2015.

(30) Foreign Application Priority Data

Sep. 1, 2015    (CN) .......................... 2015 1 0555688

(51) Int. Cl.
   *G01F 22/00*      (2006.01)
   *G01F 23/296*     (2006.01)
   *G01F 23/00*      (2006.01)

(52) U.S. Cl.
   CPC ............ *G01F 22/00* (2013.01); *G01F 23/296* (2013.01); *G01F 23/2965* (2013.01); *G01F 23/0061* (2013.01)

(58) Field of Classification Search
   CPC ...... G01F 22/00; G01F 23/2965; G01F 17/00; G01F 22/02
   See application file for complete search history.

(56) References Cited

U.S. PATENT DOCUMENTS

| | | | | |
|---|---|---|---|---|
| 4,320,659 A | * | 3/1982 | Lynnworth | ............... G01F 1/66 73/290 V |
| 4,474,061 A | * | 10/1984 | Parker | ..................... G01F 9/001 73/114.53 |

(Continued)

FOREIGN PATENT DOCUMENTS

| CN | 1348091 A | 5/2002 |
|---|---|---|
| CN | 102252729 A | 11/2011 |

(Continued)

*Primary Examiner* — Xin Y Zhong
(74) *Attorney, Agent, or Firm* — Wayne & Ken, LLC; Tony Hom

(57) ABSTRACT

The present invention discloses a method and device for measuring the volume of liquid in a container based on acoustic wave detection. The measurement method includes the following steps of: forming a cavity in a container, with the cavity being configured in such a way that acoustic waves within the cavity can be propagated only within the cavity; emitting acoustic waves into the cavity; receiving the acoustic waves reflected by an inner wall of the cavity and the liquid level; and, acquiring, based on an attenuation coefficient of the reflected acoustic waves, the volume of liquid in the container. By the method and device of the present invention, the volume of a space can be measured directly. The method and device of the present invention can be applicable to containers having irregular cavities due to no limitation to the shape of containers.

14 Claims, 3 Drawing Sheets

(56) References Cited

U.S. PATENT DOCUMENTS

| | | |
|---|---|---|
| 6,142,015 A | 11/2000 | Getman et al. |
| 6,443,004 B1 | 9/2002 | Heuft et al. |
| 2015/0025485 A1 | 1/2015 | Luckemeyer et al. |

FOREIGN PATENT DOCUMENTS

| | | |
|---|---|---|
| CN | 202693077 U | 1/2013 |
| CN | 205079828 U | 3/2016 |
| JP | 2008203205 A | 9/2008 |

\* cited by examiner

SOUND WAVE DETECTION-BASED MEASUREMENT METHOD AND DEVICE FOR LIQUID VOLUME INSIDE CONTAINER

FIELD OF THE INVENTION

The present invention relates to the field of liquid volume detection, and in particular to a method and device for measuring the volume of liquid.

BACKGROUND OF THE INVENTION

The ultrasonic liquid level measurement technology has been widely applied to the measurement of the volume of liquid. The basic principle is as follows: ultrasonic waves are emitted to the liquid level, and the reflected acoustic waves are received; then, the total distance traveled by the acoustic waves can be obtained according to the difference in time and the velocity of sound, and the height of the liquid level can thus be obtained; and, the volume of liquid is calculated by the height and the cross-sectional area of a container. However, in practical applications, this approach has several limitations: first, since the volume of liquid is indirectly obtained by the height of the liquid level, the sectional shape of the container is required to be consistent; or otherwise, the difficulty in calculation will be increased, or even the calculation cannot be performed; and second, since the ultrasonic waves have extremely high directionality, the calmness of the liquid level and the installation direction and stability of an ultrasonic probe are highly required, and it is very difficult to accurately measure the volume of water when the water level is not calm or the ultrasonic probe is deformed or displaced.

In view of the above deficiencies, the present invention provides a measurement method and device with high applicability and high accuracy.

SUMMARY OF THE INVENTION

To overcome the deficiencies of the prior art, the present invention provides a method for measuring the volume of liquid in a container based on acoustic wave detection. By this method, the volume of a space can be measured directly. The method can be applicable to containers having irregular cavities due to no limitation to the shape of containers. Meanwhile, because of low requirements on the flatness of the liquid level and the placement attitude of a container, the method has a wide range of application. The present invention is simple in structure and small in size, integrates the sealing of the container with the measurement of the volume of liquid, and is very convenient to use.

The present invention provides a device for measuring the volume of liquid in a container based on acoustic wave detection.

To solve the technical problem, the present invention employs the following technical solutions.

A method for measuring the volume of liquid in a container based on acoustic wave detection is provided, including the following steps of:

S10: forming a cavity in a container;
S20: emitting acoustic waves into the cavity;
S30: receiving the acoustic waves reflected by an inner wall of the cavity and the liquid level; and
S40: acquiring, based on an attenuation coefficient of the reflected acoustic waves, the volume of liquid in the container.

As a further improvement of the solution, the cavity is a closed cavity.

As a further improvement of the solution, in the step S20, the emission duration and wavelength of the acoustic waves are fixed values.

As a further improvement of the solution, the emission duration of the acoustic waves is greater than 10 ms.

As a further improvement of the solution, the wavelength of the acoustic waves is greater than the height of the container and less than 10 m.

As a further improvement of the solution, the method includes a step of denoising the received acoustic waves.

As a further improvement of the solution, in the step S40, the method for acquiring the volume of liquid in the container includes steps of:

S41: testing in advance attenuation coefficients of the acoustic waves of the fixed duration and wavelength after being reflected within cavities of different volumes, to form a database;
S42: acquiring the volume of the container;
S43: acquiring the volume of the cavity according to the attenuation coefficient of the acoustic waves in the step S30 and the database; and
S44: using a difference between the volume of the container and the volume of the cavity as the volume of liquid to be measured.

As a further improvement of the solution, the attenuation coefficient is an attenuation rate of the acoustic waves.

As a further improvement of the solution, the acoustic waves are emitted some time after the formation of the cavity.

As a further improvement of the solution, the acoustic waves are received immediately after the emission of the acoustic waves.

A device for measuring the volume of liquid is provided, which is used for detecting the volume of liquid stored in a cavity, including:

a main body as a bearing structure;
a loudspeaker, which is arranged on the main body and configured to emit acoustic waves into a cavity;
a microphone, which is arranged on the main body and configured to receive the acoustic waves reflected by an inner wall of the cavity and the liquid level; and
a control system configured to control the loudspeaker to emit acoustic waves into the cavity, control the microphone to receive the reflected acoustic waves and detect an attenuation coefficient of the reflected acoustic waves, and acquire the volume of liquid based on the volume of the container and the attenuation coefficient of the acoustic waves.

As a further improvement of the solution, the acoustic waves emitted by the loudspeaker have a fixed duration and wavelength; and a database is stored in the control system, and the database is a database of attenuation coefficients of the acoustic waves of the fixed duration and wavelength after being reflected within cavities of different volumes.

As a further improvement of the solution, the main body is a container or a lid.

As a further improvement of the solution, the device includes at least two conducting plates arranged on the main body and located in a same horizontal plane, and the loudspeaker and the microphone begin to operate some time after the conducting plates are connected.

As a further improvement of the solution, the device includes a conductive fixed plate arranged on the main body and an elastic plate correspondingly arranged below the fixed plate; the elastic plate can do elastic movement and thus have a first state where it is connected to the fixed plate and a second state where it is disconnected from the fixed plate; and, the loudspeaker and the microphone begin to operate some time after the elastic plate enters the first state.

The present invention has the following beneficial effects. By the method and device of the present invention, the volume of a space can be measured directly. The method and device of the present invention can be applicable to containers having irregular cavities due to no limitation to the shape of containers. Meanwhile, because of low requirements on the flatness of the liquid level and the placement attitude of a container, the method and device of the present invention have a wide range of application. The device of the present invention is simple in structure and small in size, integrates the sealing of the container with the measurement of the volume of liquid, and is very convenient to use.

BRIEF DESCRIPTION OF THE DRAWINGS

The present invention will be further described below by embodiments with reference to the accompanying drawings.

DETAILED DESCRIPTION OF THE INVENTION

The concepts, specific structures and technical effects of the present invention will be clearly and completely described below by embodiments with reference to the accompanying drawings in order to fully understand the objectives, solutions and effects of the present invention. It is to be noted that, the embodiments in the present application and the features in the embodiments can be combined if not conflicted.

It is to be noted that, unless otherwise specified, when a certain feature is regarded as being "fixed" or "connected" to another feature, this feature may be directly fixed or connected to the another feature, or may be indirectly fixed or connected to the another feature. In addition, the expressions such as upper, lower, left and right used in the present invention are merely provided with respect to the positional relationship between components in the present invention.

In addition, unless otherwise defined, the technical and scientific terms used herein have meanings the same as the common meanings interpreted by those skilled in the art. The terms used herein are merely for describing the specific embodiments and not intended to limit the present invention. The term "and/or" used herein includes any combination of one or more of related listed items.

It is well known that, when acoustic waves move within a space of a limited volume, the acoustic waves will be bounced back and forth within this space, and the energy of the acoustic waves will be lost continuously during the collision of the acoustic waves with a container and the liquid level, so that the acoustic waves are attenuated. If the space has a small volume, the acoustic waves collide with the container more frequently within unit time, and the attenuation rate is quicker; conversely, if the space has a large volume, the acoustic waves collide with the container less frequently within unit time, and the attenuation rate of the intensity of the acoustic waves is lower.

Figure 1:
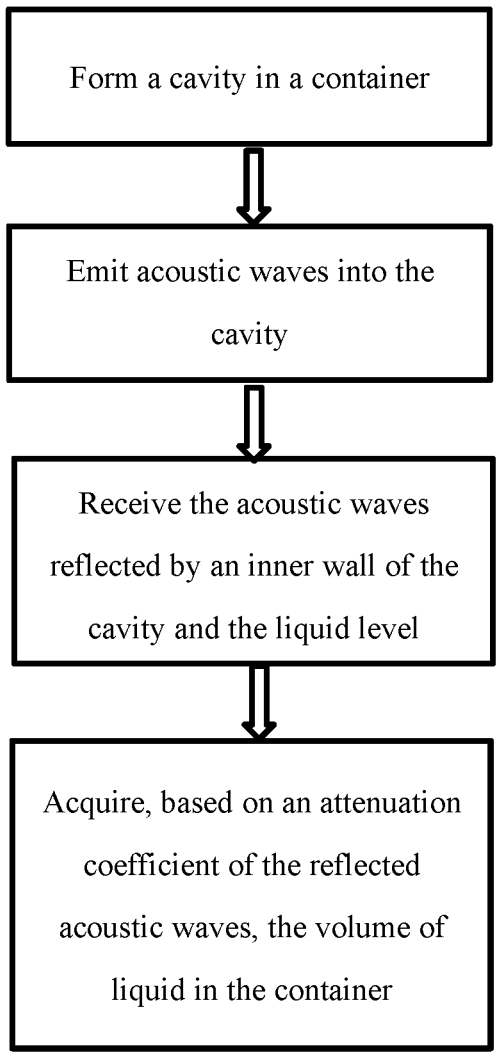
FIG. 1 is a flowchart of a detection method according to the present invention.

Depending on this physical phenomenon, this solution provides a method for measuring the volume of liquid based on acoustic wave attenuation. If there is much water in the container and the cavity has a small volume, the attenuation coefficient of the acoustic energy is larger; conversely, if there is less water in the container and the cavity has a large volume, the attenuation coefficient of the acoustic energy is smaller. Specifically, referring to FIG. 1, the method includes the following steps.

S10: A cavity is formed in a container. The cavity can reflect acoustic waves within the cavity. Preferably, the cavity is a closed cavity. More preferably, the cavity is a soundproof cavity. Of course, in the present invention, it is not required that the cavity is closed completely, and a hole, a seam or other structures can be formed on the cavity according to application requirements as long as the influence of the hole or seam structure on the result of measurement is within a controllable range.

S20: Acoustic waves are emitted into the cavity.

S30: The acoustic waves reflected by an inner wall of the cavity and the liquid level are received.

S40: The volume of liquid in the container is acquired based on an attenuation coefficient of the reflected acoustic waves.

Preferably, in the step S20, the emission duration and wavelength of the acoustic waves are fixed values. The value of the duration is preferably greater than 10 ms, so that the acoustic waves have insufficient energy and it is convenient for subsequent reception. The wavelength of the acoustic waves is preferably greater than the height of the container and less than 10 m. In this way, on one hand, the generation of standing waves is avoided, and on the other hand, low-frequency acoustic waves are prevented from penetrating through the container and thus resulting in leakage of acoustic waves.

For the acoustic waves of the fixed duration and wavelength, a preferred method for acquiring the volume of liquid in the container in the step S40 is as follows.

S41: A database for correspondence between cavities of different volumes and attenuation coefficients of acoustic waves is established. The establishment of the database is performed by tests in advance in this embodiment. Specifically, a volume value of the cavity is fixed first; then, the acoustic waves of the fixed duration and wavelength are emitted into the cavity, and the reflected acoustic waves are received; and, the attenuation coefficient of the acoustic waves is recorded. Subsequently, the volume value of the cavity is changed, and the attenuation coefficient of the acoustic waves is measured under the same other test conditions. All data are collected to form the database. The change in the volume value in each time should not be too large in order to obtain a more accurate database.

S42: The volume of the container is acquired.

S43: The volume of the cavity is derived inversely according to the attenuation coefficient of the acoustic waves detected in the step S30 and in combination with the database.

S44: The volume value of the liquid to be measured can be obtained by subtracting the volume value of the cavity from the volume value of the container.

Since the sound has a rapid propagation rate in the air, in order to avoid the excessive attenuation of acoustic waves, the acoustic waves are received in the step S30 immediately after the emission of the acoustic waves in the step S20.

In addition, since there may be noise within the cavity due to the collision between components or the residual external noise at the beginning of formation of the cavity, the acoustic waves are emitted and received some time after the formation of the cavity, preferably 1 s, thereby eliminating the interference from noise.

In order to improve the accuracy, the method further includes a step of denoising the received acoustic waves.

In this solution, the attenuation coefficient of the acoustic energy is preferably an attenuation rate.

The present invention will be described below by experimental data. Table 1 shows the comparison between the volume of liquid measured by the present invention and the actual volume of liquid, where the volume of the container is 500 ml, a liner is cylindrical and has a diameter of 5 cm, and the numerical values in this table are in unit of ml. It can be known from the data in this table that the measured data has a small deviation from the actual data, and the error can be controlled within 3%, so that this solution can realize the accurate measurement of the volume of liquid.

TABLE 1

| Actual water volume | Measured water volume | Error |
|---|---|---|
| 0 | 1 | +1 |
| 50 | 46 | −4 |
| 100 | 108 | +8 |
| 150 | 151 | +1 |
| 200 | 204 | +4 |
| 250 | 256 | +6 |
| 300 | 292 | −8 |
| 350 | 349 | −1 |
| 400 | 401 | +1 |
| 450 | 437 | −13 |
| 500 | 500 | 0 |

Table 2 shows the comparison between the result of measurement in the present invention and the result of ultrasonic measurement when the container is inclined, where the volume of the container is 500 ml, the liner is cylindrical and has a diameter of 5 cm, the angle of inclination is 30°, and the numerical values in this table are in unit of ml. It can be known from the data in this table that there is a great error of the ultrasonic when the container is inclined, and particularly, there is a maximal error when the volume of liquid is half of the volume of the container, so that the measurement almost cannot be realized. This is because the ultrasonic waves emitted by an ultrasonic liquid level measurement instrument have to be reflected by the inner wall of the cavity and the liquid level for multiple times and can then be received by an ultrasonic probe when the container is inclined. Therefore, there is a small error when there is no water or full water, while there is a maximal error when the container is filled with half water. However, by the measurement method of the present invention, the error can be controlled within 5%, so that the measurement method is great applicable.

TABLE 2

| | Result of Measurement The present invention | | Measurement method Ultrasonic measurement | |
|---|---|---|---|---|
| | Measured | | Measured | |
| Actual water volume | water volume (ml) | Error (ml) | water volume(ml) | Error (ml) |
| 0 | 3 | +3 | 1 | +1 |
| 50 | 42 | −8 | 0 | −50 |
| 100 | 100 | 0 | 1 | −99 |
| 150 | 151 | +1 | 0 | −150 |
| 200 | 203 | +3 | 0 | −200 |
| 250 | 263 | +13 | 20 | −230 |
| 300 | 294 | −6 | 23 | −277 |
| 350 | 345 | −5 | 37 | −313 |
| 400 | 401 | +1 | 197 | −203 |
| 450 | 437 | −13 | 361 | −89 |
| 500 | 499 | −1 | 477 | −23 |

Figure 2:
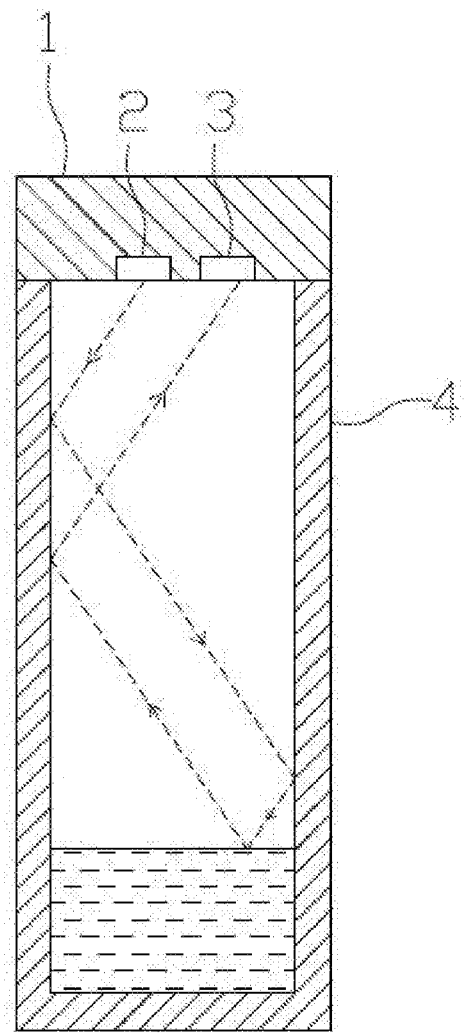
FIG. 2 is a detection principle diagram of a detection device when there is less liquid in a container.
Figure 3:
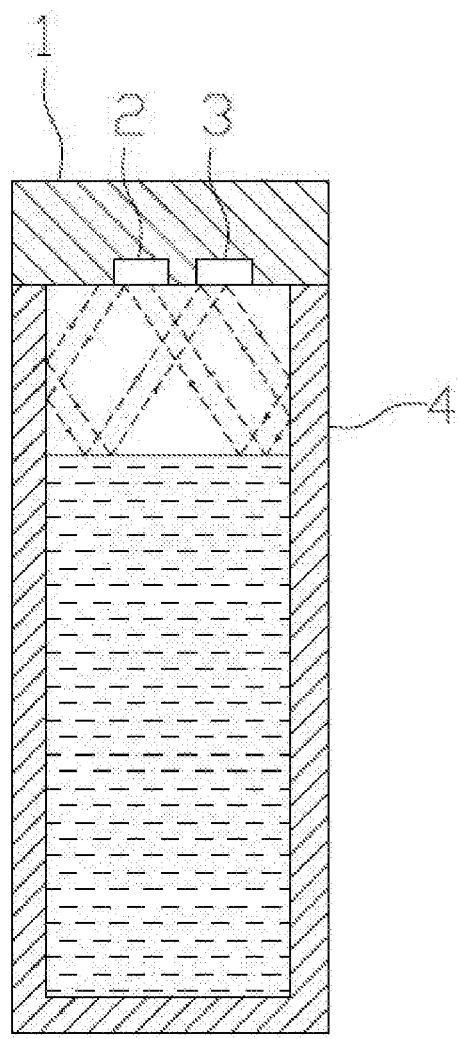
FIG. 3 is a detection principle diagram of a detection device when there is much liquid in a container.

The present invention further discloses a measurement device, referring to FIGS. 2 and 3, including a main body 1, a loudspeaker 2, a microphone 3 and a control system (not shown). The main body 1 acts as a bearing structure and configured to allow the loudspeaker, the microphone and the control system mount thereon. Under the control of the control system, the loudspeaker 2 and the microphone 3 emit and receive ultrasonic waves, respectively; the control system detects the reflected ultrasonic waves to obtain an attenuation coefficient; and the system acquires the volume of liquid based on the volume of the container and the attenuation coefficient.

As a further improvement of the solution, the acoustic waves emitted by the loudspeaker have a fixed duration and wavelength; and a database is stored in the control system, and the database is a database of attenuation coefficients of the acoustic waves of the fixed duration and wavelength after being reflected within cavities of different volumes.

As a preferred embodiment of the measurement device, the measurement device can be an independent structure configured to measure the volume of liquid within the existing cavity, for example, monitoring the volume of oil in an automobile oil tank. The main body 1, the loudspeaker 2, the microphone 3 and the control system are integrated into an independent measurement device, and this measurement device is mounted within the oil tank to measure the volume of liquid.

As another preferred embodiment of the measurement device, the measurement device can be a part of the cavity. In this embodiment, the main body is preferably a container or a lid. When the main body is a container, the loudspeaker 2, the microphone 3 and the control system are mounted on the container, and the container needs to be matched with a container lid to form the cavity. Similarly, when the main body is lid, the loudspeaker 2, the microphone 3 and the control system are mounted on the lid, and the lid needs to be matched with a container to form the cavity. In this embodiment, preferably, the main body is a lid. The main body is applicable to a container such as a kettle, and can integrate the sealing of the kettle with the measurement of the volume of liquid, so that it is convenient for a user to use.

It can be understood that the loudspeaker 2, the microphone 3 and the control system can also be mounted on a container and a container lid, respectively.

In order to realize more accurate measurement of the volume of liquid, the measurement device further includes a trigger device. As an embodiment of the trigger device, by taking the main body being a container lid as example, the device includes at least two conducting plates arranged on the container lid and located in a same horizontal plane. The device is applicable to conductive containers. When the cavity is formed between the lid and the container, a container opening simultaneously comes into contact with the conducting plates, so that a conducting circuit is formed between the conducting plates to further trigger the loudspeaker 2 and the microphone 3 to operate.

This embodiment is merely applicable to containers having a conducting function, but not to containers made of insulating material. In addition, due to the error, there may be a case in which the container cannot simultaneously come into contact with the limiting devices so that the simultaneous measurement cannot be realized. Therefore, the present invention provides a further improvement. The trigger device includes a conductive fixed plate and an elastic plate correspondingly arranged below the fixed plate. The elastic plate can do elastic movement and thus have a first state where it is connected to the fixed plate and a second state where it is disconnected from the fixed plate. After the cavity is formed by the lid and the container, the container opening is resisted against the elastic plate to allow the elastic plate to come into with the fixed plate, so that a conducting circuit is formed between the elastic plate and the fixed plate to further trigger the loudspeaker and the microphone to operate.

In order to eliminate the influence from the residual noise, the loudspeaker and the microphone begin to operate some time after being triggered.

Although two typical trigger methods of the present invention have been described above, the present invention is not limited thereto, and there may be other trigger methods, such as Hall magnetic induction, photoelectric trigger or electric field coupling.

Although the preferred embodiments of the present invention have been specifically described above, the present invention is not limited thereto. Those skilled in the art can make various equivalent variations or replacements without departing from the spirit of the present invention, and these equivalent variations or replacements shall fall into the scope defined by the appended claims of the present application.

What is claimed is:

1. A method for measuring a volume of liquid in a container based on acoustic wave detection, comprising following steps of:
   S10: forming a cavity in a container;
   S20: emitting acoustic waves reflected by an inner wall of the cavity and a liquid level into the cavity, the acoustic waves attenuate in a process of reflection;
   S30: receiving the acoustic waves reflected by the inner wall of the cavity and the liquid level;
   S40: acquiring, based on an attenuation coefficient of reflected acoustic waves, a volume of the cavity in the container; and
   S50: acquiring, based on a volume of the container and the volume of the the cavity, the volume of liquid in the container.

2. The method for measuring a volume of liquid in a container based on acoustic wave detection according to claim 1, wherein the cavity is a closed cavity.

3. The method for measuring a volume of liquid in a container based on acoustic wave detection according to claim 2, wherein, in the step S20, an emission duration and a wavelength of the acoustic waves are fixed values.

4. The method for measuring a volume of liquid in a container based on acoustic wave detection according to claim 3, wherein the emission duration of the acoustic waves is greater than 10 ms.

5. The method for measuring a volume of liquid in a container based on acoustic wave detection according to claim 3, wherein the wavelength of the acoustic waves is greater than a height of the container and less than 10 m.

6. The method for measuring a volume of liquid in a container based on acoustic wave detection according to claim 3, wherein, in the step S40, the method for acquiring the volume of liquid in the container comprises steps of:
   S41: testing in advance attenuation coefficients of the acoustic waves of a fixed duration and wavelength after being reflected within cavities of different volumes, to form a database;
   S42: acquiring the volume of the container;
   S43: acquiring the volume of the cavity according to the attenuation coefficient of the acoustic waves in the step S30 and the database; and
   S44: using a difference between the volume of the container and the volume of the cavity as the volume of liquid to be measured.

7. The method for measuring a volume of liquid in a container based on acoustic wave detection according to claim 6, wherein the attenuation coefficient is an attenuation rate of the acoustic waves.

8. The method for measuring a volume of liquid in a container based on acoustic wave detection according to claim 6, wherein the acoustic waves are emitted one second after a formation of the cavity.

9. The method for measuring a volume of liquid in a container based on acoustic wave detection according to claim 8, wherein the acoustic waves are received immediately after an emission of the acoustic waves.

10. The method for measuring a volume of liquid in a container based on acoustic wave detection according to claim 1, further comprising a step of denoising the received acoustic waves.

11. A device for measuring a volume of liquid, which is used for detecting the volume of liquid stored in a container, comprising:
    a main body as a bearing structure;
    a loudspeaker, which is arranged on the main body and configured to emit acoustic waves into a cavity;
    a microphone, which is arranged on the main body and configured to receive the acoustic waves reflected by an inner wall of the cavity and a liquid level; and
    a control system configured to control the loudspeaker to emit acoustic waves into the cavity, control the microphone to receive the reflected acoustic waves and detect an attenuation coefficient of the reflected acoustic waves to acquire a volume of the cavity in the container and acquire the volume of liquid based on a volume of the container and the volume of the cavity.

12. The device for measuring a volume of liquid according to claim 11, wherein the acoustic waves emitted by the loudspeaker have a fixed duration and wavelength; and a database is stored in the control system, and the database is a database of attenuation coefficients of the acoustic waves of the fixed duration and wavelength after being reflected within cavities of different volumes.

13. The device for measuring a volume of liquid according to claim 11, wherein the main body is a container or a lid.

14. The device for measuring a volume of liquid according to claim 12, wherein the main body is a container or a lid.

\* \* \* \* \*